United States Patent [19]
Shelly et al.

[11] Patent Number: 5,495,579
[45] Date of Patent: Feb. 27, 1996

[54] CENTRAL PROCESSOR WITH DUPLICATE BASIC PROCESSING UNITS EMPLOYING MULTIPLEXED CACHE STORE CONTROL SIGNALS TO REDUCE INTER-UNIT CONDUCTOR COUNT

[75] Inventors: William A. Shelly, Phoenix; Ronald E. Lange, Glendale; Donald C. Boothroyd, Phoenix, all of Ariz.

[73] Assignee: Bull HN Information Systems Inc., Billerica, Mass.

[21] Appl. No.: 218,532

[22] Filed: Mar. 25, 1994

[51] Int. Cl.⁶ .................................................. G06F 11/00
[52] U.S. Cl. ............................ 395/185.05; 395/185.1; 395/185.06
[58] Field of Search .................. 395/575, 185.05, 395/185.01, 185.1, 182.08, 185.06; 371/68.3, 11.3, 11.1, 49.3, 49.2, 49.1, 9.1, 51.1, 48

[56] References Cited

U.S. PATENT DOCUMENTS

| | | | |
|---|---|---|---|
| 3,938,083 | 2/1976 | Stansfield | 371/49.3 |
| 4,358,823 | 11/1982 | McDonald et al. | 371/68.3 |
| 4,773,072 | 9/1988 | Fennel | 371/11.3 |
| 4,853,932 | 8/1989 | Nitschke et al. | 371/68.3 |
| 5,095,458 | 3/1992 | Sato | 371/51.1 |
| 5,136,595 | 8/1992 | Kimura | 395/575 |
| 5,195,101 | 3/1993 | Guenthner et al. | 371/68.3 |
| 5,220,662 | 6/1993 | Lipton | 395/575 |
| 5,231,640 | 7/1993 | Hanson et al. | 371/68.3 |
| 5,249,187 | 9/1993 | Bruckert et al. | 371/68.3 |
| 5,263,034 | 11/1993 | Guenthner et al. | 371/68.3 |
| 5,271,023 | 12/1993 | Norman | 371/68.3 |
| 5,276,862 | 1/1994 | McCulley et al. | 395/575 |

*Primary Examiner*—Robert W. Beausoliel, Jr.
*Assistant Examiner*—Joseph E. Palys
*Attorney, Agent, or Firm*—J. H. Phillips; J. S. Solakian

[57] ABSTRACT

In order to validate data manipulation results in a CPU which incorporates duplicate basic processing units or integrity, which BPUs are typically each implemented on a single VLSI circuit chip, and which is capable of performing single and double precision data manipulation to obtain first and second data manipulation results, which should be identical, and a cache unit for receiving data manipulation results from both BPUs and for transferring specified information words simultaneously to both BPUs upon request. These operations are controlled by cache interface control signals identically generated in each BPU. In each BPU, the control signals are arranged into first and second groups which are nominally identical. The first control signal group is transmitted to the cache unit from one BPU while the second control group is transmitted to the cache unit from the other BPU. In each BPU, parity is generated for each control group separately. Parity for the group sent to the cache unit by each BPU is included with the control signal information for checking in the cache unit. Parity for the group not sent to the cache unit by each BPU is transmitted to the other BPU and checked against the locally generated parity for that group. In the event of a parity miscompare sensed in either BPU or a parity error sensed in the cache unit, an error signal is issued to institute appropriate remedial action.

5 Claims, 4 Drawing Sheets

CENTRAL PROCESSOR WITH DUPLICATE BASIC PROCESSING UNITS EMPLOYING MULTIPLEXED CACHE STORE CONTROL SIGNALS TO REDUCE INTER-UNIT CONDUCTOR COUNT

FIELD OF THE INVENTION

This invention relates to the art of data processing and, more particularly, to a central processing unit (CPU) using dual basic processing units (BPUs) each situated on a single very large scale integrated (VLSI) circuit chip, which BPUs employ multiplexed control signals to reduce inter-unit conductor count.

Background of the Invention

Powerful and reliable mainframe CPUs may incorporate duplicate BPUs which work independently to execute the same instruction or instruction series in parallel such that the results can be compared to insure identity. It has now become feasible to incorporate an entire BPU on a VLSI circuit, a feature which has the advantage of not only occupying less space, but also enjoys the capability to run faster. However, there is a practical limit to the number of conductive leads which can be connected to a VLSI circuit. This problem arises because each of the duplicate BPUs has typically required a double word result bus which, for example in one computer family in which the present application finds application, means the provision of two 80-bit result buses to a cache unit, one coupled to each BPU.

One viable approach to obtaining reliable redundant double word transfer of information from the BPUs to the cache within the conductive lead limitations imposed as a practical matter on VLSI chips is disclosed in copending U.S. patent application Ser. No. 08/065,105 entitled CENTRAL PROCESSING UNIT USING DUAL BASIC PROCESSING UNITS AND COMBINED RESULT BUS, filed May 19, 1993, by Donald C. Boothroyd et al and assigned to the assignee of the present application. In that invention, the desired end was achieved by providing a CPU incorporating duplicate BPUs and two cache units, each cache unit being dedicated to handling half-bytes of information. Each cache unit included bit-by-bit comparison circuitry to validate the half-byte results received from both BPUs in the case of single precision operations, and, in the case of double precision operations, one cache unit employed the same bit-by-bit comparison circuitry to validate, for both cache units, the result parity bits, and hence the half-byte results, received from both BPUs.

However, one of the major challenges that traditional mainframe vendors face as personal computers and workstations become more and more powerful is in differentiating their midrange systems from the rapidly advancing smaller machines. One significant area in which mainframe machines can be made distinguishable from the smaller machines is in the area of fault tolerance. Therefore, it would be highly desirable to preserve a high degree of fault tolerant operation while still achieving the necessary chip pin count reduction. The present invention is directed to this end and to obtaining other desirable results which are a consequence of the implementation of the invention.

Objects of the Invention

It is therefore a broad object of this invention to provide an improved CPU which incorporates duplicate BPUs for integrity, which BPUs are typically each implemented on a single VLSI circuit chip, and which employs half size, double word result busses for transferring data manipulation results to cache storage.

It is a more specific object of this invention to provide a CPU incorporating duplicate BPUs and a cache unit, a first BPU segregating even bits of a data manipulation result and transferring the same, along with parity information, to the cache storage and a second BPU segregating odd bits of the same data manipulation result and transferring the same, along with parity information, to the cache storage.

Summary of the Invention

Briefly, these and other objects of the invention are achieved, in a presently preferred embodiment of the invention, by providing first and second basic processing units adapted to redundantly perform data manipulations on received data to obtain first and second data manipulation results, which should be identical, and a cache unit for receiving data manipulation results from both BPUs and for transferring specified information words simultaneously to both BPUs upon request. These operations are controlled by cache interface control signals identically generated in each BPU. In each BPU, the control signals are arranged into first and second groups which are nominally identical; i.e., should be identical unless there has been an error. The first control signal group is transmitted to the cache unit from one BPU while the second control group is transmitted to the cache unit from the other BPU. Integrity is assured by a special cross check process. In each BPU, parity is generated for each control group separately. Parity for the group sent to the cache unit by each BPU is included with the control signal information for checking in the cache unit. Parity for the group not sent to the cache unit by each BPU is transmitted to the other BPU and checked against the locally generated parity for that group. In the event of a parity miscompare sensed in either BPU or a parity error sensed in the cache unit, an error signal is issued to institute appropriate remedial action.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
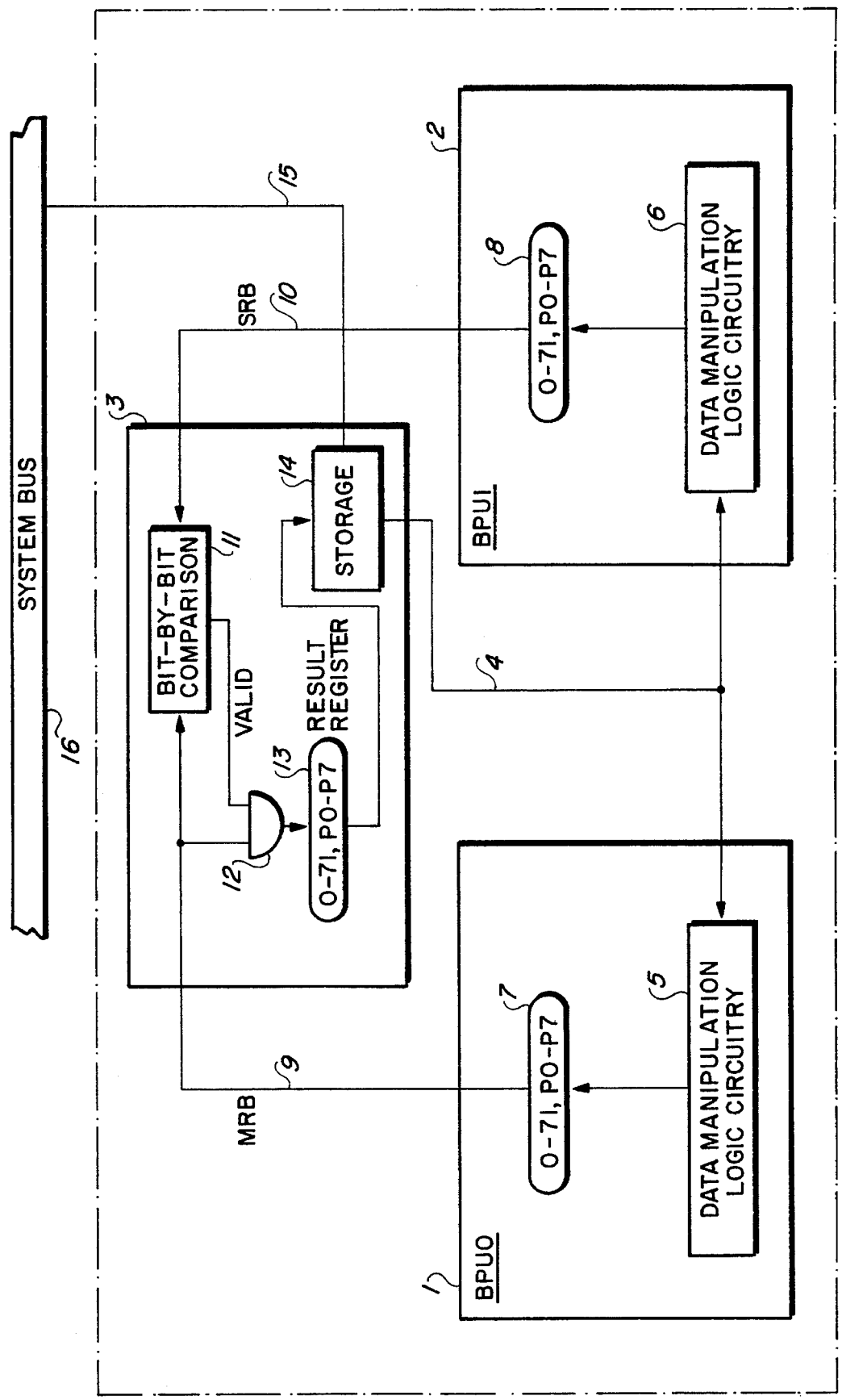
FIG. 1 is a block diagram of a typical prior art CPU incorporating duplicate BPUs and capable of performing single and double precision data manipulation and storing the validated results in a cache memory.

Referring first to FIG. 1, there is shown a block diagram of a typical prior art CPU incorporating duplicate BPUs which is capable of performing single and double precision data manipulation and storing the validated results in an internal cache memory. In the exemplary system, a data word is 36 bits wide, and each 9-bit data byte carries its own parity bit such that each full byte is 10 bits wide with the parity bit placed in the least significant bit position. Thus, a full single precision 4-byte word with parity information is 40 bits wide, and a double precision 8-byte word is 80 bits wide.

A first BPU (BPU0) 1 may be deemed the "master" BPU, and a second BPU (BPU1) 2 is the "slave" BPU. In operation, both BPUs 1, 2 receive the same information from a cache unit (DTX) 3, via 80-bit wide BPU input bus 4, and perform the same operations in redundant fashion in their respective data manipulation logic circuitry blocks 5, 6. The results, which should be identical, appear in respective buffer registers 7, 8. In the case of single precision operations, depending upon a given CPU design, only half the buffer registers 7, 8 may be used, or the single precision results may be duplicated in the upper and lower halves of each of the buffer registers. In the case of double precision operations, of course, each result is 80 bits wide, including the parity bits. The master results are transferred to the cache unit 3 on 80 bit wide master result bus (MRB) 9 while the slave results are similarly transferred to the cache unit on 80 bit wide slave result bus (SRB) 10.

The results of each data manipulation operation, as obtained by each of the master and slave BPUs 1, 2, are compared, bit-by-bit, in comparison block 11 within the cache unit 3. (Bit-by-bit comparison circuits are well known in the art; for example, reference may be taken to the relevant disclosure, incorporated herein, in U.S. Pat. 5,195,101, the invention of which is assigned to the same Assignee as the subject invention.) If the results are identical, a "valid" signal issued by the comparison block 11 enables AND-gate array 12 to permit the master results to be transferred to result register 13 and thence to storage block 14. (It will be understood that if the results are invalid, appropriate error handling operations will be undertaken.) Information stored in or to be stored into the cache unit 3 may be made available to or received from other system components (e.g., other CPUs, I/O units, main memory, etc., not shown) via 80-bit wide input/output bus 15 and system bus 16 in the manner well known in the art.

It will be observed that both the MRB and the SRB are 80-bits wide such that, if a BPU is implemented on a single VLSI chip, the configuration of FIG. 1, which is capable of high performance in carrying out both double precision and single precision data manipulation operations, may not be usable because of the practical limitation on the number of conductive connections that can reliably be made to a single very dense and physically small VLSI chip.

Figure 2:
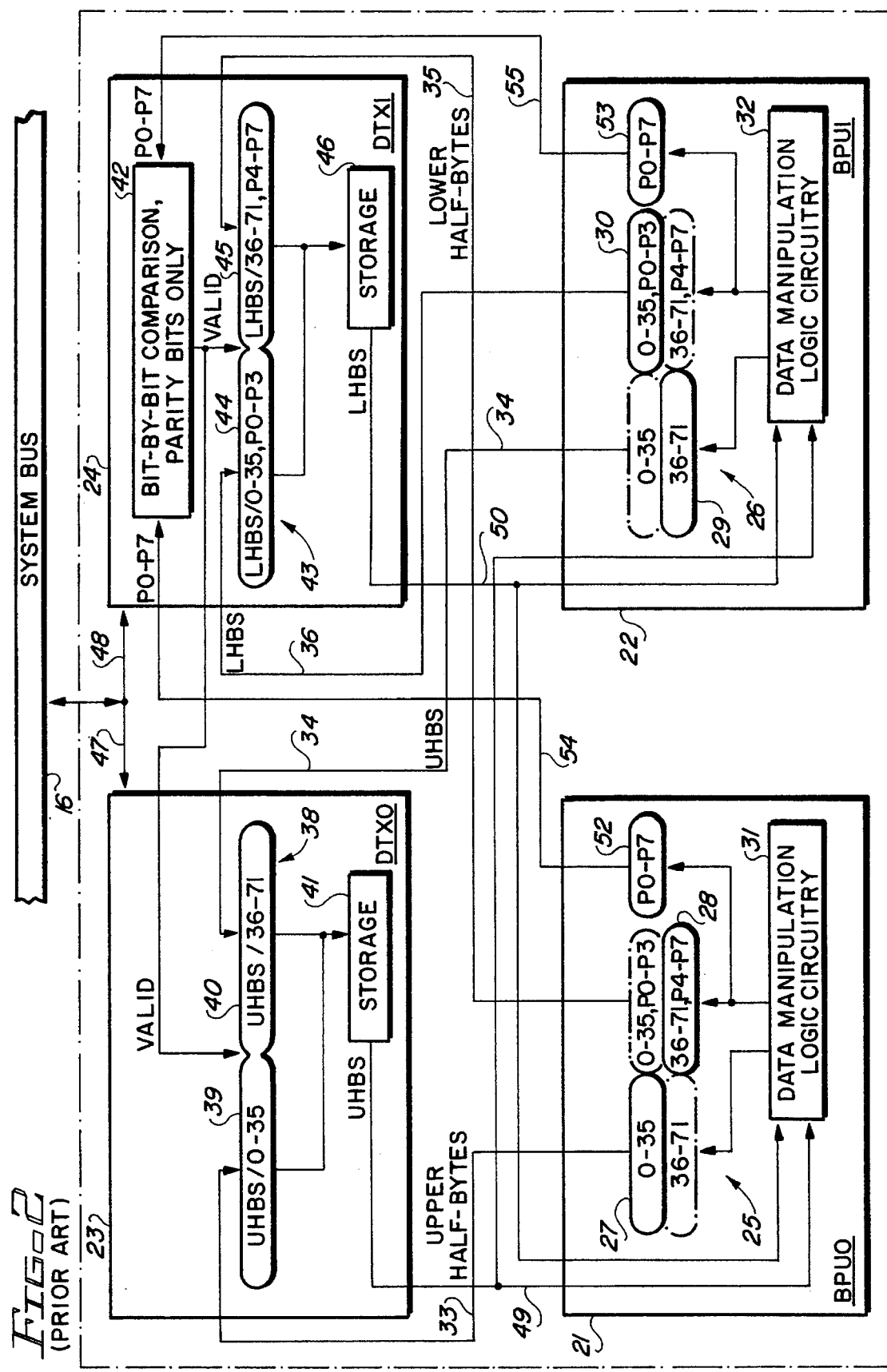
FIG. 2 is block diagram of a prior art single VLSI chip CPU shown configured to execute double precision data manipulation operations and cache stores with reduced chip pin count achieved by using half-byte result bus techniques.

Attention is now directed to FIG. 2 which illustrates in block diagram form the logic by which a prior art invention overcomes this obstacle in the performance of (by way of example) double precision data manipulation operations. In this configuration, BPU0 21 and BPU1 22 are not related as master and slave, but rather are peers which, however, receive identical information on which to perform data manipulations in a manner similar to that performed by the BPUs previously discussed and shown in the configuration of FIG. 1. BPU0 21 and BPU1 22 each communicate with cache units DTX0 23 and DTX1 24. Each buffer multiplexer, 25, 26, respectively, receives the results of a given data manipulation performed by the respective logic blocks 31, 32 into upper half-byte sections 27, 29 and lower half-byte sections 28, 30. The upper half-bytes from the buffer register sections 27, 29 are transferred to the cache units 23, 24 via respective 20-bit wide UHB busses 33, 34. Similarly, the lower half-bytes from the buffer register sections 28, 30 are transferred to the cache units 23, 24 via respective 20-bit wide LHB busses 35, 36. Since, in the exemplary system, each data byte includes a parity bit in the least significant bit position, all the parity bits are resident in the lower half-bytes which are transferred to the cache unit 24.

For single precision operations, the system shown in FIG. 2 duplicates the results in the upper 27, 29 and lower 28, 30 halves of the buffer registers 25, 26 and in the cache units 23, 24. Those skilled in the art will understand that this design choice offers certain performance advantages which are adaptable to systems in which only single, non-duplicated, word results are stored for single precision operations.

Referring to again to FIG. 2, assume that the data manipulation blocks 31, 32 in the BPUs 21, 22 have been assigned a double precision operation. The double precision results will be placed in the buffer multiplexers 25, 26 such that: 1) the upper half-bytes of the low order word (data bits 0–35) are placed in the buffer register section 27 of the buffer multiplexer 25; 2) the upper half-bytes of the high order word (data bits 36–72) are placed in the buffer register section 29 of the buffer multiplexer 26; 3) the lower half-bytes (which include the parity bits) of the low order word (data bits 0–35) are placed in the buffer register section 28 of the buffer multiplexer 25; and the lower half-bytes (which include the parity bits) of the high order word (data bits 36–72) are placed in the parity buffer register section 30 of the buffer multiplexer 26. In addition, parity bit buffer registers 52, 53 in, respectively, the BPU0 21 and BPU1 22 receive the parity bits 0–7; i.e., each parity buffer register is loaded with a complete set of the parity bits present in the result generated by the data manipulation logic block resident in its BPU.

The complete sets of parity bits are respectively conveyed from the parity bit buffer registers 52, 53 to bit-by-bit comparison block 42 in cache unit DTX1 24 via parity busses 54, 55. If the two sets of parity bits are identical, the "valid" signal issues in the cache unit DTX1 24 to admit the lower half-bytes from each of the BPUs 21 and 22 into the result register 43 and thence to the storage block 46. In addition, this "valid" signal is coupled to the DTX0 23 by line 56 to enable the transfer of the upper half-bytes from each of the BPUs 21 and 22 into the result register 38 and thence to the storage block 41. Therefore, the complete, validated double precision result is stored in cache memory, the combination of the storage blocks 41 and 43, from which the data can be read to the BPUs 21 and 22 and/or the system bus 16.

Thus, the data output lines comprising the busses 33 (20 bits wide), 33 (20 bits wide), 54 (8 bits wide) and 35 (20 bits wide), 36 (20 bits wide), 55 (8 bits wide) from each of the BPUs 21, 22 to the cache units 23, 24 are 48 lines, rather than 80 lines, wide such that the line counts to the VLSI chips incorporating the BPUs are reduced accordingly. Since the same apparatus is employed for both single and double precision operations, it is this reduction from 80 to 48 output lines per BPU which represents the effective pin count advantage over the FIG. 1 configuration.

Figure 3:
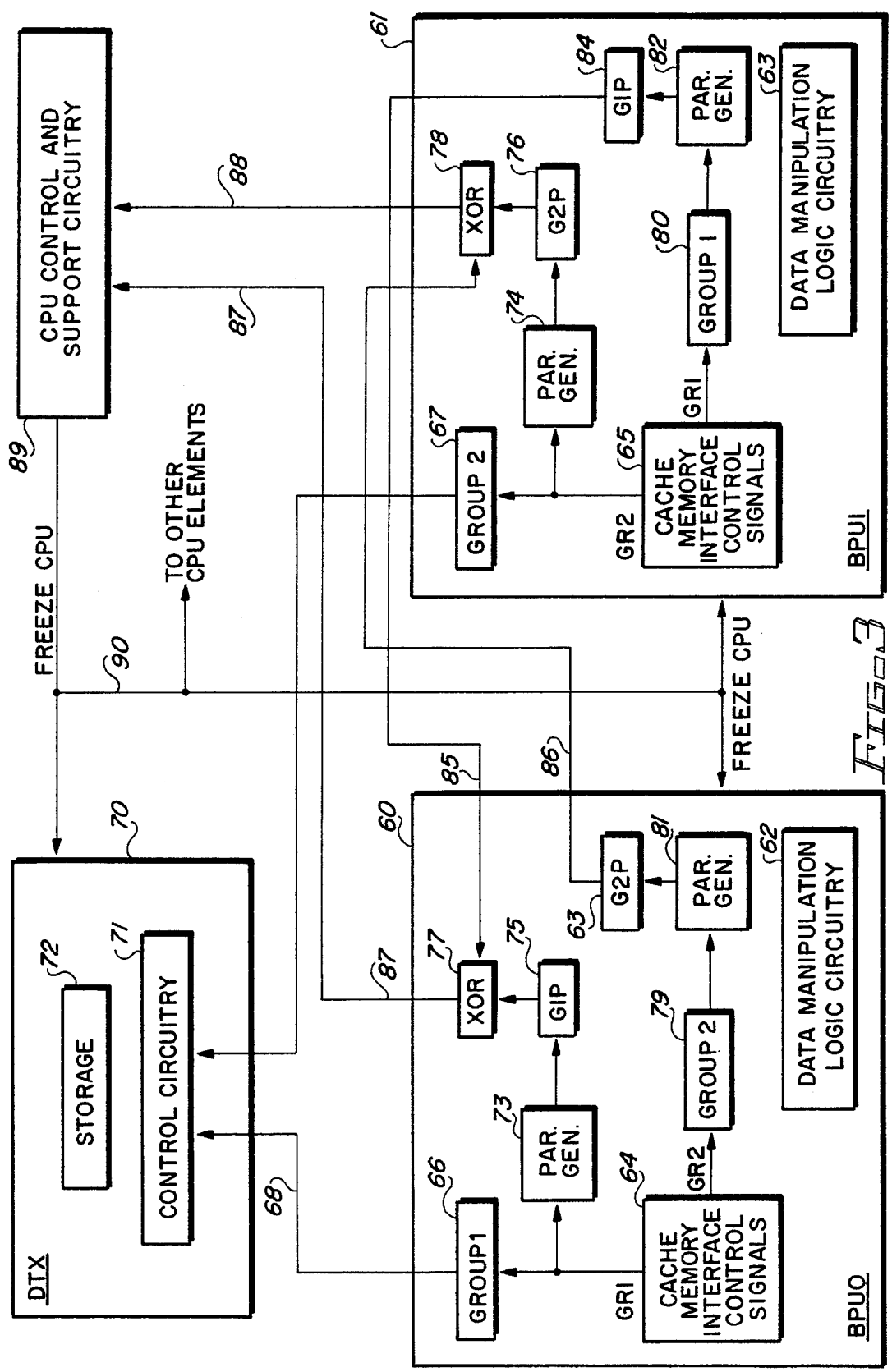
FIG. 3 is a first simplified logic diagram illustrating the handling of cache memory interface signals in the duplicate BPUs.
Figure 4:
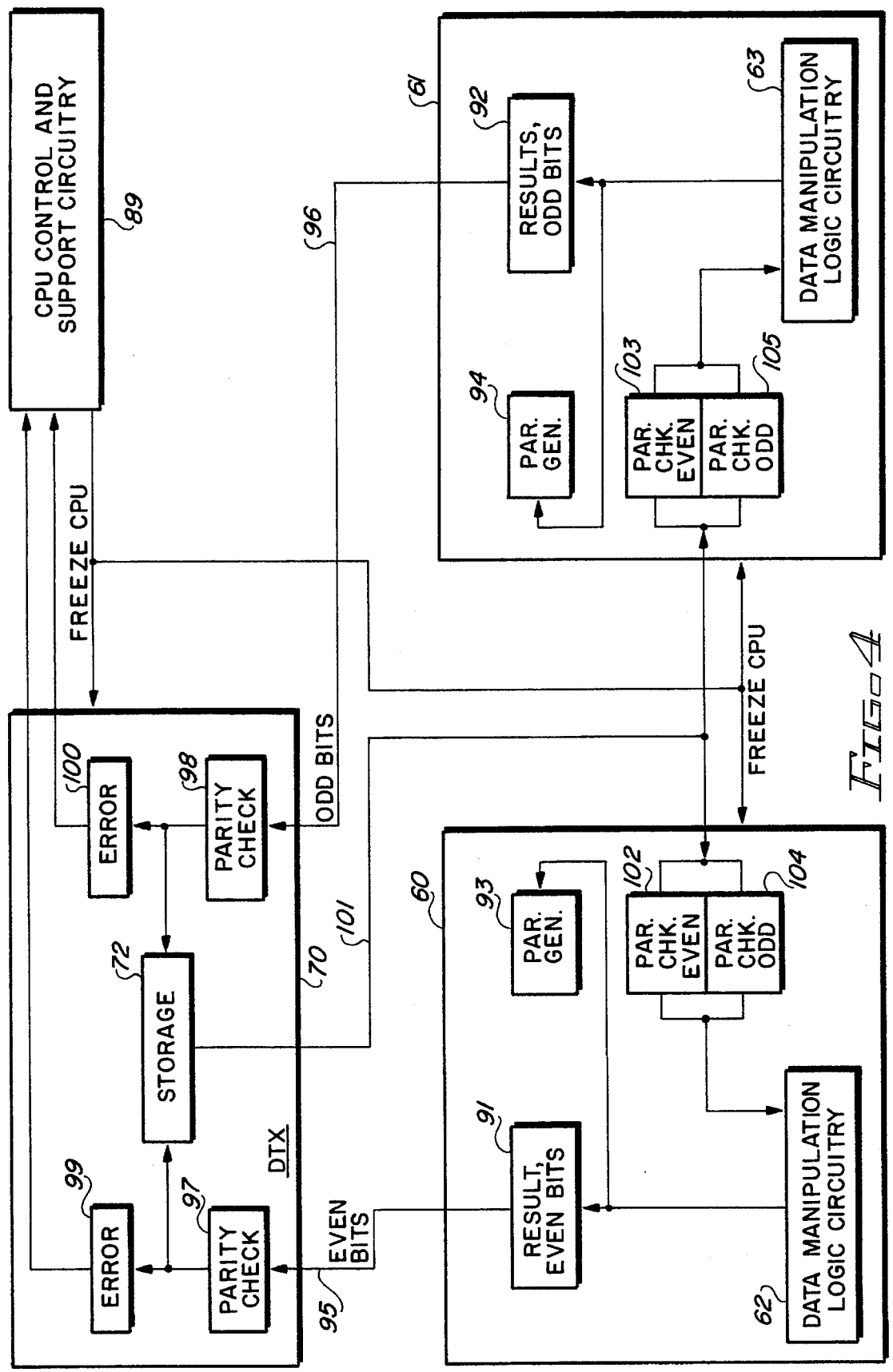
FIG. 4 is a second simplified logic diagram illustrating the invention and particularly the handling of data integrity in the duplicate BPUs and the cache unit while enjoying a significant reduction of the communication lines therebetween.

Attention is now directed to FIGS. 3 and 4 which reveal the present invention by which the pin count reduction requirements are met in an entirely different manner and in which data integrity is further enhanced. FIG. 3 is a simplified logic diagram illustrating an aspect of the invention relating to the handling of cache memory interface signals in the duplicate BPUs; and FIG. 4 is a simplified logic diagram illustrating an aspect of the invention relating to the handling of data integrity in the duplicate BPUs.

Referring first to FIG. 3, BPU0 60 and BPU1 61 are peers as in the FIG. 2 configuration discussed above. The BPUs 60, 61, respectively include identical data manipulation logic circuitry blocks 62, 63 which perform data manipulation redundantly and arrive at nominally identical results; i.e., the results should be identical. As previously described, the results of such data manipulation must be transferred to and from cache memory from time-to-time, and this operation is under the control of a set of cache memory interface control signals. These signals originate in identical cache memory interface control signal blocks 64, 65 disposed, respectively, in the BPUs 60, 61. The control signals are divided into two groups: group one and group two. Each group of these signals as separately generated in the two BPUs are nominally identical at any given time; i.e., they should be identical, but may not be in the event of an error.

In BPU0, the group one control signals are transferred to a control signal buffer 66 and thence onto a first control signal bus 68 which conveys the group one signals to a control circuit, block 71 in a cache unit DTX 70. Similarly, in BPU1, the group two control signals are transferred to a control signal buffer 67 and thence onto a second control signal bus 69 which conveys the group two signals to the control circuitry block 71 in cache unit 70. In this manner, a complete set of cache memory interface control signals are delivered from the BPUs to the cache unit to conventionally control the transfer of information between the storage block 72 in the cache unit 70 and the data manipulation logic circuitry blocks 62, 63 in the BPUs. That is, the control circuitry block 71 receives the first and second groups of control signals and employs them to control operations in the cache unit instituted by the first and second basic processing units;

In BPU0, the group one control signals are also applied to a parity generator 73 to generate a parity bit which is placed in buffer G1P 75 for application to a first input to EXCLUSIVE-OR-gate 77. Similarly, in BPU1, the group two control signals are also applied to a parity generator 74 to generate a parity bit which is placed in buffer G2P 76 for application to a first input to XOR-gate 78.

In BPU0, the group two control signals are transferred into a buffer 79 and thence to another parity generator 81 to generate a parity bit which is placed in buffer G2P 83. In BPU1, the group one control signals are transferred into a buffer 80 and thence to another parity generator 82 to generate a parity bit which is placed in buffer G1P 84.

The BPU1 61 Group one parity bit held in buffer G1P 84 is sent, via single line 85, to a second input to XOR-gate 77 in BPU0 60. Similarly, the Group two parity bit held in buffer G2P 83 in BPU0 is sent, via single line 86, to a second input to XOR-gate 78 in BPU1.

Those skilled in the art will understand that the transfer characteristics of a two-input XOR-gate are such that it will only be enabled if one, and only one, input is enabled. Since the BPUs 60, 61 are operating redundantly, the control signals generated in the cache memory interface control signals blocks 64, 65 should always be identical. It will be seen that with the cross parity checking configuration described above, any deviation from identity will promptly be sensed in one or the other or both the XOR-gates 77, 78. In such an event, an error signal will be conveyed over one or both the lines 87, 88 to CPU control and support circuitry block 89. The CCSC block 89 may respond in any conventional manner to institute remedial action appropriate to the specific environment such as be issuing a "freeze CPU" signal on line 90 to all CPU components to stop further processing until remedial action is taken such as a retry or taking the faulting CPU out of the system.

It will also be understood that the group one and group two interface control signals could each be divided into a plurality of bytes and that the parity generators 73, 74, 81, 82 could correspondingly develop a parity bit for each byte. Then, the multi-bit parity information could be cross compared in blocks 77, 78 which would then take the form of an array of XOR-gates or the logical equivalent.

Referring now to FIG. 4, the scheme for transferring data between the cache unit 70 and the BPUs 60, 61 will be described. After the data manipulation logic circuitry blocks 62, 63 perform redundant data manipulations, they should independently reach identical results. In BPU0 60, the even bits of the result are segregated into buffer register 91 and in BPU1 61, the odd bits of the result are placed in buffer register 92. In the exemplary environment in which the invention is used, double words are always transmitted. Therefore, at the end of a single precision data manipulation operation (much more common than double precision), buffer register 91 in BPU0 will contain the even bits of the result redundantly and also four parity bits generated by parity generator 93; i.e.: even bits only of 0–35,0–35 for a total of 36 data bits plus P0–P3 for the 36 even data bits. Similarly, buffer register 92 in BPU1 will contain the odd bits of 0–35,0–35 for a total of 36 data bits plus P0–P3, generated by parity generator 94, for the 36 odd data bits. It will be apparent to those skilled in the art that, for double precision operations, buffer register 91 in BPU0 will contain the 36 even bits of 0–72, P0–P3, and buffer register 92 in BPU1 will contain the corresponding 36 odd bits of 0–72 and the appropriate four parity bits, P0–P3.

The even and odd result bits are conveyed to the cache unit DTX 70 on 40-bit wide result busses 95, 96, respectively. In the cache unit, the even bits are first examined by parity check block 97 and are then transferred to cache storage block 72. Similarly, the odd bits are examined by parity check block 98 and are then transferred to cache storage block 72. In this manner, a full, 72-bit wide result and eight parity bits are stored in cache storage 72. In the event either or both the parity check blocks 97, 98 detect a parity error, one or two error signals, represented by the blocks 99, 100, will be generated and sent to the CCSC 89 which may respond in the appropriate fashion as previously discussed. During normal, error free operation, when called upon by the BPUs 60, 61, full 80-bit words (72 data bits plus eight parity bits) are transferred from the cache storage block 72 to the data manipulation logic circuitry blocks 62, 63 via bus 101 and parity checking apparatus in the BPUs. If the even and odd parity bits have been stored in cache storage 72, then respective even and odd parity checking apparatus 102, 103, 104, 105 may be provided. If new byte-by-byte parity bits were generated in the cache unit 70 prior to storage in cache memory 72, these bits may be checked in the more conventional manner in the BPUs. Any parity errors detected by the blocks 102, 103, 104, 105 also result in error signals (not shown as this is conventional) being sent to the CCSC 89 for handling.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processing unit comprising:
   A) first and second basic processing units adapted to redundantly perform data manipulations on received data to obtain first and second data manipulation results;
   B) a cache unit for receiving data manipulation results from said first and second basic processing units, said cache unit including means for storing such data manipulation results as information words among an array of information words and for transferring specified information words simultaneously to both said first and second basic processing units upon a request therefrom;
   C) first cache interface control signal generation means in said first basic processing unit and second cache interface control signal generation means in said second basic processing unit, each said first and second cache interface control signal generation means issuing first and second groups of control signals, said first groups of control signals being nominally identical, and said second groups of control signals being nominally identical;
   D) a first control signal bus for communicating said first group of control signals from said first basic processing unit to said cache unit;
   E) a second control signal bus for communicating said second group of control signals from said second basic processing unit to said cache unit;
   F) first parity generating means in said first basic processing unit for developing group one parity information comprising at least one parity bit for said first group of control signals generated therein;
   G) second parity generating means in said first basic processing unit for developing group two parity information comprising at least one parity bit for said second group of control signals generated therein;
   H) third parity generating means in said second basic processing unit for developing partly information comprising at least one parity bit for said first group of control signals generated therein;
   I) fourth parity generating means in said second basic processing unit for developing parity information comprising at least one parity bit for said second group of control signals generated therein;
   J) a first parity bus for communicating said group two parity information developed in said first basic processing unit to said second basic processing unit;
   K) a second parity bus for communicating said group one parity information developed in said second basic processing unit to said first basic processing unit;
   L) parity checking means in said first basic processing unit for comparing said group one parity information developed in said first basic processing unit to said group one parity information developed in said second basic processing unit and for issuing an error signal in response to a miscompare; and
   M) parity checking means in said second basic processing unit for comparing said group two parity information developed in said first basic processing unit to said group two parity information developed in said second basic processing unit and for issuing an error signal in response to a miscompare.

2. The central processing unit of claim 1 which further includes control means responsive to a control signal group parity error sensed in at least one of said first basic processing unit and said second basic processing unit to take predetermined remedial action.

3. The central processing unit of claim 1 in which:
   A) said first parity generating means in said first basic processing unit develops a parity bit for each byte of said first group of control signals generated therein;
   B) said second parity generating means in said first basic processing unit develops a parity bit for each byte of said second group of control signals generated therein;
   C) said third parity generating means in said second basic processing unit generates a parity bit for each byte of said first group of control signals generated therein; and
   D) said fourth parity generating means in said second basic processing unit develops a parity bit for each byte of said second group of control signals generated therein.

4. The central processing unit of claim 2 in which:
   A) said first parity generating means in said first basic processing unit develops a parity bit for each byte of said first group of control signals generated therein;
   B) said second parity generating means in said first basic processing unit develops a parity bit for each byte of said second group of control signals generated therein;
   C) said third parity generating means in said second basic processing unit generates a parity bit for each byte of said first group of control signals generated therein; and
   D) said fourth parity generating means in said second basic processing unit develops a parity bit for each byte of said second group of control signals generated therein.

5. A central processing unit comprising:
   A) first and second basic processing units adapted to redundantly perform data manipulations on received data to obtain first and second data manipulation results;
   B) a cache unit for receiving data manipulation results from said first and second basic processing units, said cache unit including means for storing such data manipulation results as information words among an array of information words and for transferring specified information words simultaneously to both said first and second basic processing units upon a request therefrom;
   C) first cache interface control signal generation means in said first basic processing unit and second cache interface control signal generation means in said second basic processing unit, each said first and second cache interface control signal generation means issuing first and second groups of control signals, said groups of control signals being nominally identical, and said second groups of control signals being nominally identical;
   D) a first control signal bus for communicating said first group of control signals from said first basic processing unit to said cache unit;
   E) a second control signal bus for communicating said second group of control signals from said second basic processing unit to said cache unit;

F) control circuitry means in said cache unit for receiving said first and second groups of control signals and for employing such control signals to control operations in said cache unit instituted by said first and second basic processing units;

G) first parity generating means in said first basic processing unit for developing group one parity information comprising at least one parity bit for said first group of control signals generated therein;

H) second parity generating means in said first basic processing unit for developing group two parity information comprising at least one parity bit for said second group of control signals generated therein;

I) third parity generating means in said second basic processing unit for developing parity information comprising at least one parity bit for said first group of control signals generated therein;

J) fourth parity generating means in said second basic processing unit for developing parity information comprising at least one parity bit for said second group of control signals generated therein;

K) a first parity bus for communicating said group two parity information developed in said first basic processing unit to said second basic processing unit;

L) a second parity bus for communicating said group one parity information developed in said second basic processing unit to said first basic processing unit;

M) parity checking means in said first basic processing unit for comparing said group one parity information developed in said first basic processing unit to said group one parity information developed in said second basic processing unit and for issuing an error signal in response to a miscompare; and N) parity checking means in said second basic processing unit for comparing said group two parity information developed in said first basic processing unit to said group two parity information developed in said second basic processing unit and for issuing an error signal in response to a miscompare; and O) control means responsive to a control signal group parity error sensed in at least one of said first basic processing unit and said second basic processing unit to take predetermined remedial action.

\* \* \* \* \*